US012663215B2

(12) United States Patent
Rhee et al.

(10) Patent No.: US 12,663,215 B2
(45) Date of Patent: Jun. 23, 2026

(54) INTEGRATED COOLING MODULE

(71) Applicant: Hanon Systems, Daejeon (KR)

(72) Inventors: Sangyong Rhee, Daejeon (KR); In-Guk Hwang, Daejeon (KR); Dong Suk Lee, Daejeon (KR); Hae-Jun Lee, Daejeon (KR); Sang Ok Lee, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 109 days.

(21) Appl. No.: 18/283,475

(22) PCT Filed: May 31, 2022

(86) PCT No.: PCT/KR2022/007719
§ 371 (c)(1),
(2) Date: Sep. 22, 2023

(87) PCT Pub. No.: WO2022/255769
PCT Pub. Date: Dec. 8, 2022

(65) Prior Publication Data
US 2024/0167769 A1 May 23, 2024

(30) Foreign Application Priority Data
Jun. 1, 2021 (KR) ........................ 10-2021-0070985

(51) Int. Cl.
*F28D 1/053* (2006.01)
*B60H 1/00* (2006.01)
(Continued)

(52) U.S. Cl.
CPC ..... *F28D 1/05391* (2013.01); *B60H 1/00921* (2013.01); *B60H 1/3227* (2013.01);
(Continued)

(58) Field of Classification Search
CPC .............. B60H 1/00921; B60H 1/3227; B60H 1/00571; B60H 2001/00928; B60K 11/02; F28D 1/05391; F01P 11/04
See application file for complete search history.

(56) References Cited

U.S. PATENT DOCUMENTS 9,902,284 B2 * 2/2018 Brandauer .......... H01M 10/615
12,151,539 B2 * 11/2024 Calderone ............ B60H 1/3223
(Continued)

FOREIGN PATENT DOCUMENTS

DE 60215471 8/2007
DE 102020124471 3/2021
(Continued)

OTHER PUBLICATIONS

International Search Report issued in PCT/KR2022/007719 on Sep. 1, 2022.
(Continued)

*Primary Examiner* — Ljiljana V. Ciric
(74) *Attorney, Agent, or Firm* — NORTON ROSE FULBRIGHT US LLP

(57) ABSTRACT

An integrated cooling module includes a plate-shaped manifold and multiple cooling components mounted thereon. The manifold includes stacked first and second plates that form a first refrigerant channel recessed along a line structure of the first plate, while the second plate provides a flat sealing surface. A third plate can be further stacked to form a second refrigerant channel, and through-holes in the second plate allow communication between channels. Ports formed in the plates enable direct connection with external components. A condenser, chiller, expansion valve, pressure/temperature sensor, and an accumulator may be mounted on the manifold, which is arranged perpendicular to a bottom surface.

17 Claims, 13 Drawing Sheets

(51) Int. Cl.
    *B60H 1/32*           (2006.01)
    *B60K 11/02*        (2006.01)
    *F01P 11/04*         (2006.01)

(52) U.S. Cl.
    CPC ............... *B60K 11/02* (2013.01); *F01P 11/04*
        (2013.01); *B60H 1/00571* (2013.01); *B60H*
                     *2001/00928* (2013.01)

(56)           References Cited

U.S. PATENT DOCUMENTS

| | | | |
|---|---|---|---|
| 12,391,096 B2 * | 8/2025 | Rhee | ........................ F25B 41/40 |
| 2013/0071716 A1 * | 3/2013 | Frutschy | ............. H01M 10/657 |
| | | | 429/120 |
| 2015/0090426 A1 | 4/2015 | Hirsch et al. | |
| 2024/0167769 A1 * | 5/2024 | Rhee | ...................... B60K 11/02 |

| | | | |
|---|---|---|---|
| 2025/0283641 A1 * | 9/2025 | Kim | ........................ F25B 41/42 |
| 2025/0369698 A1 * | 12/2025 | Kim | .................... B60H 1/3229 |

FOREIGN PATENT DOCUMENTS

| | | | | |
|---|---|---|---|---|
| EP | 2854212 A1 * | 4/2015 | ......... | H01M 10/625 |
| KR | 20120030848 A | 3/2012 | | |
| KR | 101557286 B1 * | 10/2015 | ........ | H05K 7/20845 |
| KR | 20190002878 A | 1/2019 | | |
| KR | 20190068125 A | 6/2019 | | |
| KR | 20200031907 A | 3/2020 | | |
| KR | 20210022220 A | 3/2021 | | |
| WO | WO 2021048095 | 3/2021 | | |

OTHER PUBLICATIONS

English translation of Official Action issued Oct. 16, 2025 in related German Patent Application No. 112022001862.3, 10 pgs.

* cited by examiner

ACCU

Chiller

EXV

IHX

PT Sensor

COND

100

10

INTEGRATED COOLING MODULE

CROSS REFERENCE TO RELATED APPLICATIONS

This patent application is a national phase under 35 U.S.C. § 371 of International Patent Application No. PCT/KR2022/007719 filed May 31, 2022, which claims the benefit of priority from Korean Patent Application No. 10-2021-0070985 filed Jun. 1, 2021, each of which is hereby incorporated herein by reference in its entirety for all purposes.

TECHNICAL FIELD

The present invention relates to an integrated cooling module applied to a vehicle cooling system, and more particularly, to an integrated cooling module in which components are integrated with a plate-shaped manifold to eliminate a hose or pipe and reduce a size and weight of the entire cooling system, and the plate-shaped manifold is configured by coupling an arcuate plate and a flat plate to improve manufacturability, rigidity, and sealability.

BACKGROUND ART

Recently, as there is gradually increasing interest in energy efficiency and problems of environmental pollution, there is a need for development of environmental-friendly vehicles that can substantially replace internal combustion engine vehicles. The environmental-friendly vehicles are typically classified into an electric vehicle which operates by using fuel cells or electricity as a power source, and a hybrid vehicle that operates by using an engine and a battery.

Unlike an air conditioning device for a general vehicle, a separate heater is not used for an electric vehicle or a hybrid vehicle among the environmental-friendly vehicles. The air conditioning system applied to the environmental-friendly vehicle typically refers to a heat pump system.

Meanwhile, the electric vehicle generates driving power by converting energy, which is generated by a chemical reaction between oxygen and hydrogen, into electrical energy. In this process, because thermal energy is generated by a chemical reaction in a fuel cell, it is essential to effectively remove generated heat to ensure performance of the fuel cell.

Further, the hybrid vehicle also generates driving power by operating an engine that uses general fuel to operate and operating a motor by using electric power supplied from the fuel cell or an electric battery. Therefore, to ensure performance of the motor, it is necessary to effectively remove heat generated from the fuel cell or battery and the motor.

Therefore, in the hybrid vehicle or the electric vehicle in the related art, a battery cooling system needs to be configured as a separate closed circuit, together with a cooling system and a heat pump system, in order to prevent heat generation by the motor, the electrical components, the fuel cell, and the battery.

For this reason, there are problems in that a size and weight of a cooling module disposed at a front side of a vehicle are increased, and layouts of connection pipes for supplying a refrigerant or coolant to a heat pump system, a cooling means, and a battery cooling system in an engine room are complicated.

Document of Related Art

Korean Patent Application Laid-Open No. 2019-0068125 (Jun. 18, 2019)

DISCLOSURE

Technical Problem

The present invention has been made in an effort to solve the above-mentioned problem, and an object of the present invention is to provide an integrated cooling module in which components are integrated with a plate-shaped manifold to eliminate a hose or pipe and reduce a size and weight of the entire cooling system, and the plate-shaped manifold is configured by coupling an arcuate plate and a flat plate to improve manufacturability, rigidity, and sealability.

Technical Solution

An example of the present invention provides an integrated cooling module including: a plate-shaped manifold; and components mounted on the plate-shaped manifold, in which the plate-shaped manifold has a structure in which first and second plates are stacked and coupled such that a first refrigerant channel is formed therein, in which the first refrigerant channel is recessed in a first line structure of the first plate formed along the first refrigerant channel, and in which the second plate is a flat plate having one surface and the other surface formed flat.

A border surface of a rear surface of the first plate, which adjoins one surface of the second plate, may be a flat surface.

The second plate may be formed such that at least a part of one surface of the second plate is formed in a shape identical to a shape of a rear surface of the first plate.

One or more first ports may be provided in the first plate and communicate directly with the first refrigerant channel so as to communicate with the outside.

The plate-shaped manifold may be disposed to be perpendicular to a bottom surface.

The components may be mounted on a front surface of the plate-shaped manifold, and the components may include a condenser, a chiller, a PT sensor, and an expansion valve.

The condenser and the chiller may be disposed such that a longitudinal direction of the condenser and the chiller is parallel to a gravitational direction.

An accumulator may be further mounted on one side surface of the plate-shaped manifold, and the accumulator may communicate with the first refrigerant channel.

The condenser may be disposed at one end, and the accumulator may be disposed at the other end when the plate-shaped manifold is viewed from the front side.

The condenser may be a water-cooled condenser, and a plate type inner heat exchanger P-IHX may be further mounted on the front surface of the plate-shaped manifold.

The condenser may be an air-cooled condenser, and an inner heat exchanger IHX may be integrally accommodated in the accumulator.

The plate-shaped manifold may further include a third plate, the plate-shaped manifold may have a structure in which the second plate and the third plate are stacked and coupled such that a second refrigerant channel is additionally formed therein, and the second refrigerant channel may be recessed in a second line structure of the third plate formed along the second refrigerant channel.

A border surface of a rear surface of the third plate, which adjoins the other surface of the second plate, may be a flat surface.

The second plate may be formed such that at least a part of the other surface of the second plate is formed in a shape identical to a shape of a rear surface of the third plate.

One or more second ports may be provided in the third plate and communicate directly with the second refrigerant channel so as to communicate with the outside.

The second plate may have one or more through-holes formed through the second plate to allow the first refrigerant channel and the second refrigerant channel to communicate with each other.

An accumulator may be mounted on one side surface of the plate-shaped manifold, and the accumulator may communicate with both the first refrigerant channel and the second refrigerant channel.

Advantageous Effects

According to the present invention, the components are integrated with the plate-shaped manifold to eliminate a hose or pipe, thereby achieving miniaturization and weight reduction of the entire cooling system. Further, the mounting structures for mounting the components in the vehicle may be eliminated, which may reduce the number of components and the number of assembling processes at the time of configuring the cooling system.

In addition, the plate-shaped manifold may be configured by coupling the arcuate plate and the flat plate, thereby improving the manufacturability, rigidity, and sealability.

BRIEF DESCRIPTION OF THE DRAWINGS

FIG. 1 is viewed at another angle.

MODE FOR INVENTION

Hereinafter, the present invention will be described with reference to the accompanying drawings.

Figure 1:
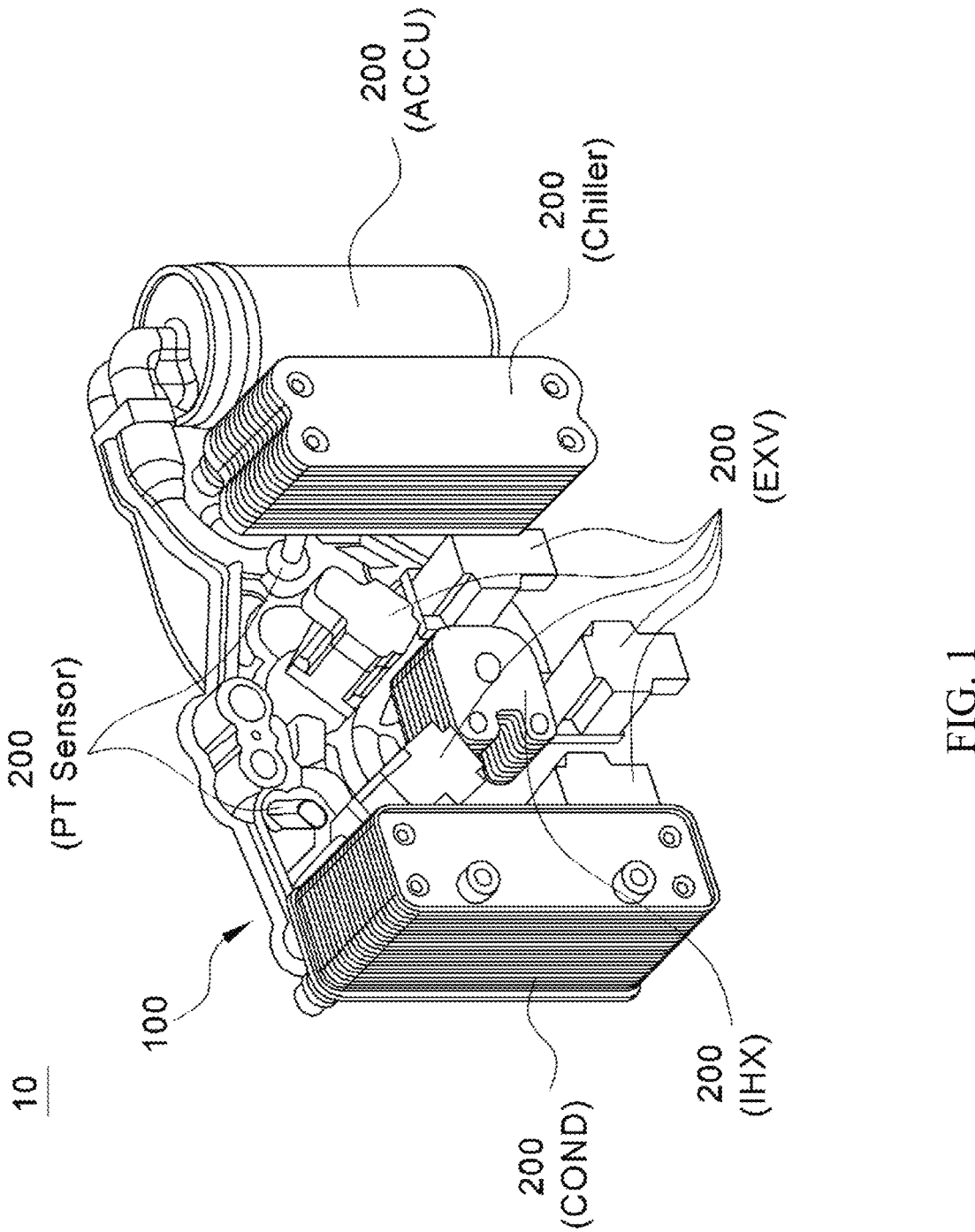
FIG. 1 is a front perspective view of an integrated cooling module according to an example of the present invention.
Figure 2:
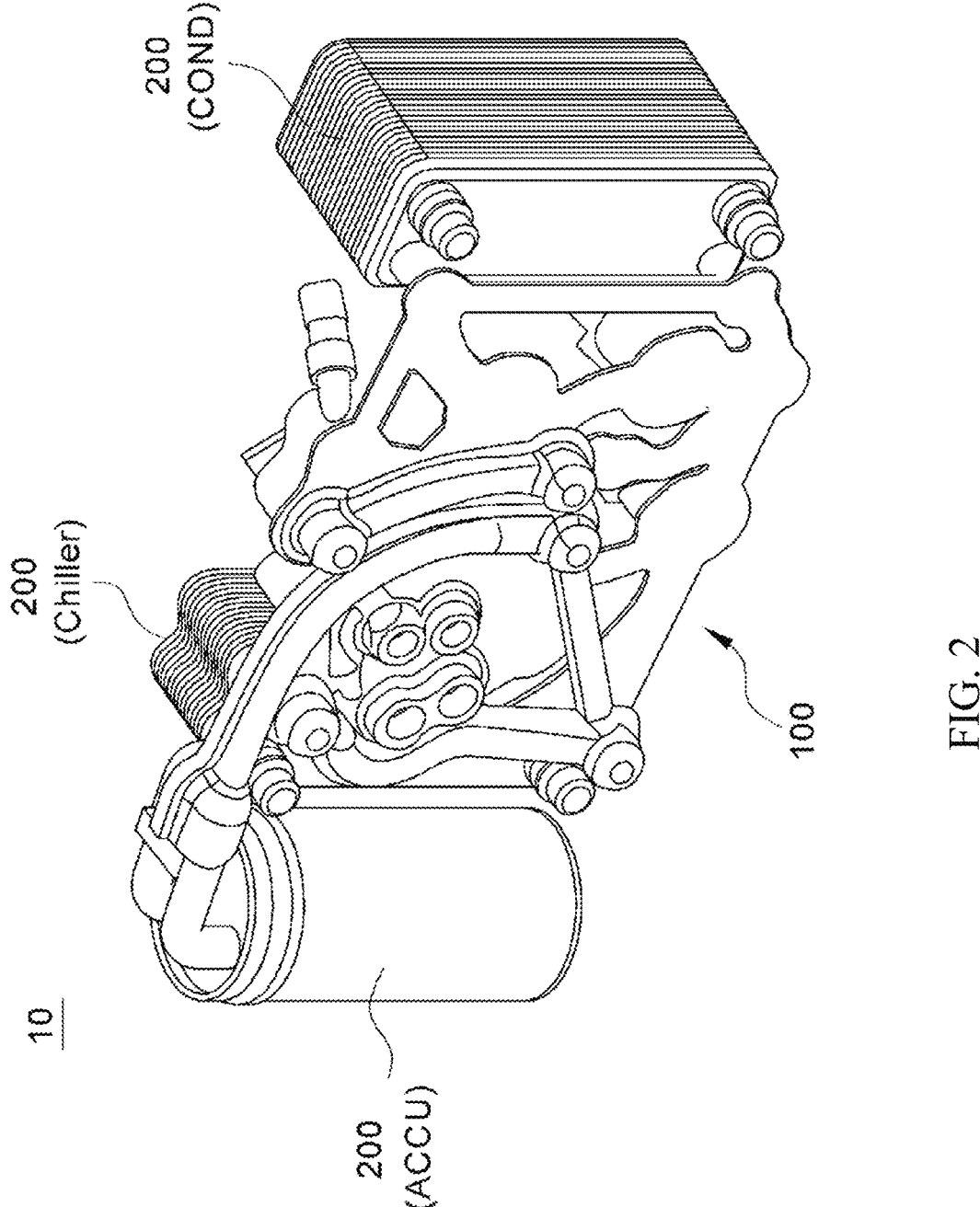
FIG. 2 is a rear perspective view of FIG. 1.
Figure 3:
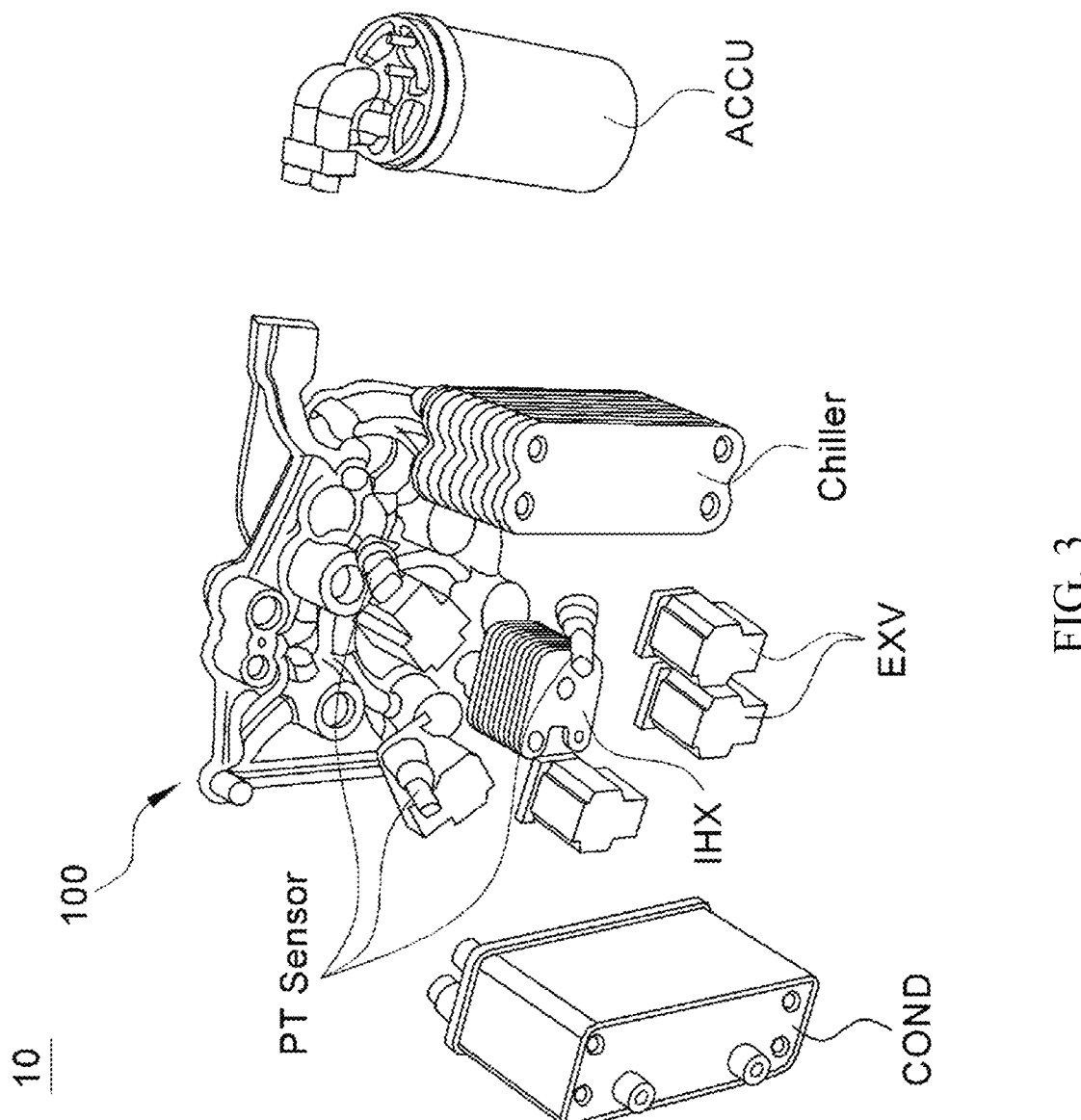
FIG. 3 is a rear exploded perspective view when

FIG. 1 is a front perspective view of an integrated cooling module according to an example of the present invention, FIG. 2 is a rear perspective view of FIG. 1, and FIG. 3 is a rear exploded perspective view when FIG. 1 is viewed at another angle. As illustrated, the integrated cooling module of the present invention may broadly include a plate-shaped manifold 100, and a plurality of components 200 mounted on the plate-shaped manifold.

In the present invention, the components 200 are integrated with the plate-shaped manifold 100. The plate-shaped manifold 100 provides a mounting space in which the plurality of components 200 may be mounted. The plate-shaped manifold 100 has therein refrigerant channels in which a refrigerant may flow.

The components 200 are constituent elements of a vehicle cooling system. In the present invention, the components may be any one or more components selected from a condenser COND, a chiller, a PT sensor, an expansion valve EXV, and an inner heat exchanger IHX and further include an accumulator ACCU.

The condenser (COND) is a heat exchanger configured to condense a gaseous refrigerant into a liquid refrigerant. The chiller is a heat exchanger configured to remove heat from the liquid refrigerant. The PT sensor (pressure/temperature sensor) is a sensor configured to measure pressure and temperature of the refrigerant. The expansion valve (EXV) is a valve configured to vaporize the liquid refrigerant by lowering the pressure of the liquid refrigerant. The inner heat exchanger (IHX) is a heat exchanger configured to allow a high-temperature liquid refrigerant and a low-temperature gaseous refrigerant to exchange heat with each other. The accumulator (ACCU) is a liquid separator configured to separate the liquid refrigerant and the gaseous refrigerant.

The components 200 are mounted on the plate-shaped manifold 100 and constitute an integrated cooling module 10. In this case, the components 200 are mounted to communicate with the refrigerant channels provided in the plate-shaped manifold 100. More specifically, the components 200 are mounted to communicate with mounting ports corresponding to the components among the mounting ports formed in the plate-shaped manifold 100 and configured to communicate with the refrigerant channels, such that the components 200 may communicate with the refrigerant channels. In this case, the refrigerant channels formed in the plate-shaped manifold 100 may include first refrigerant channels 115 and second refrigerant channels 135. The refrigerant channels will be more specifically described below.

Figure 4:
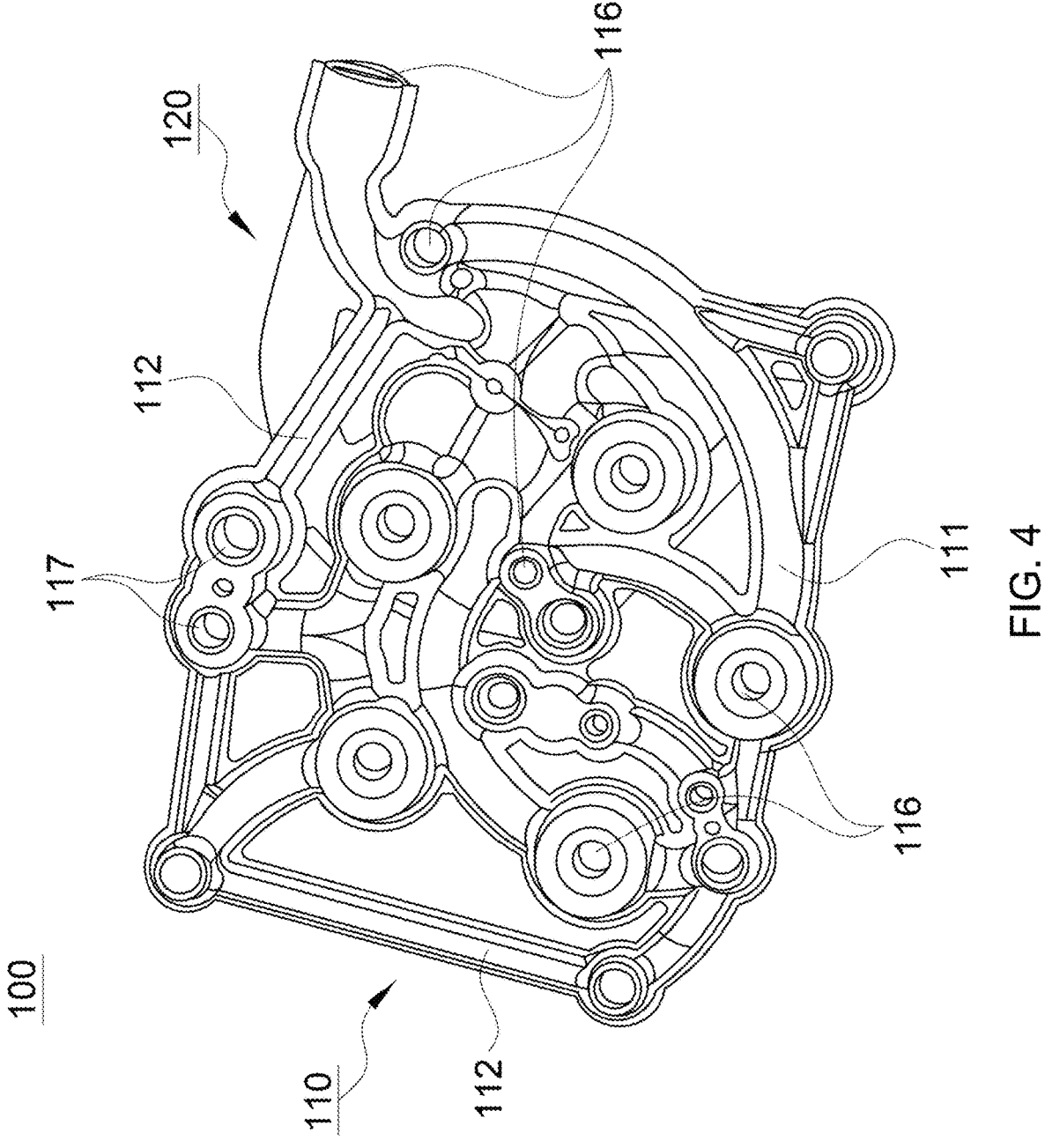
FIG. 4 is a front perspective view of a plate-shaped manifold according to the example of the present invention.
Figure 5:
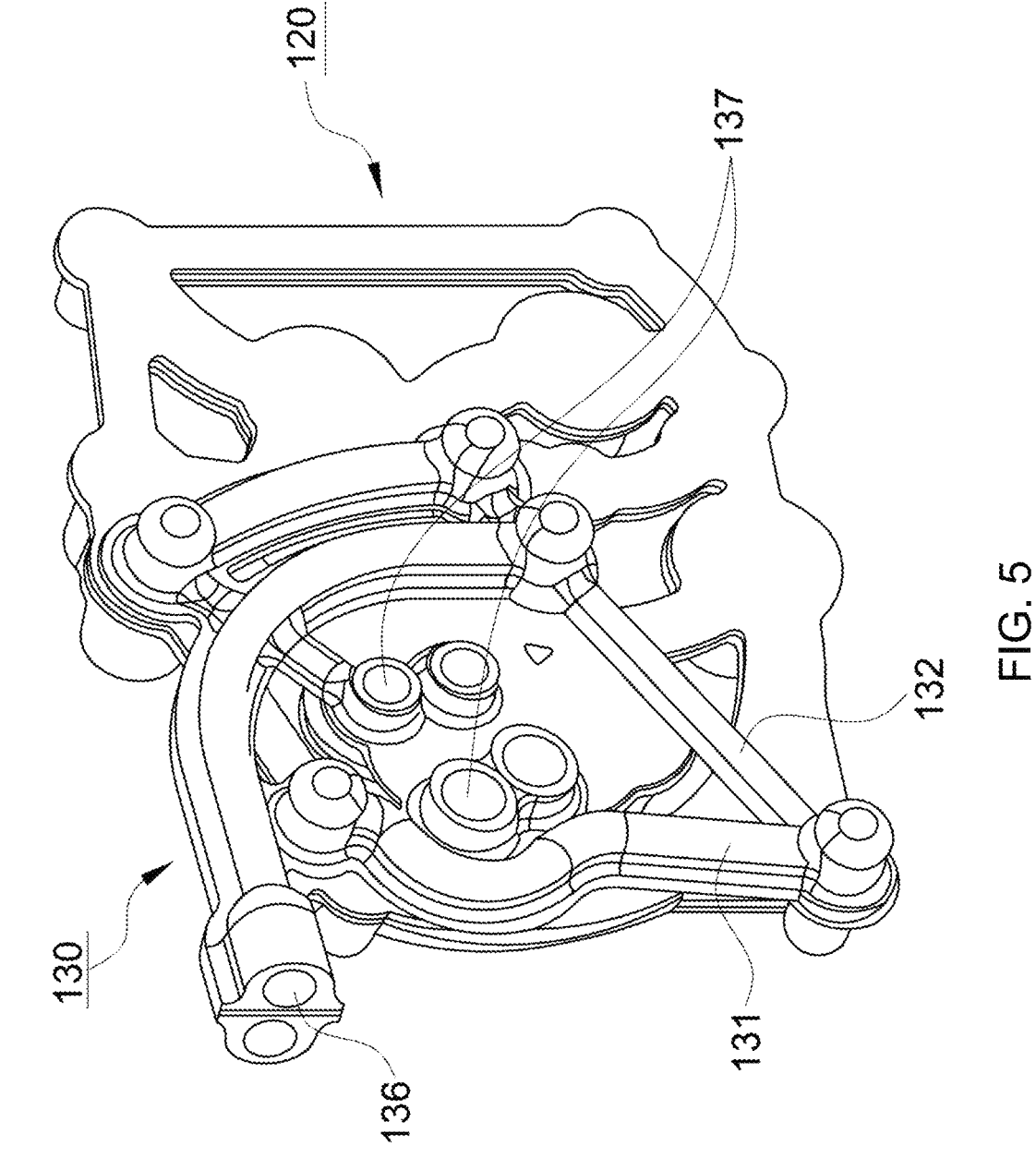
FIG. 5 is a rear perspective view of FIG. 4.
Figure 6:
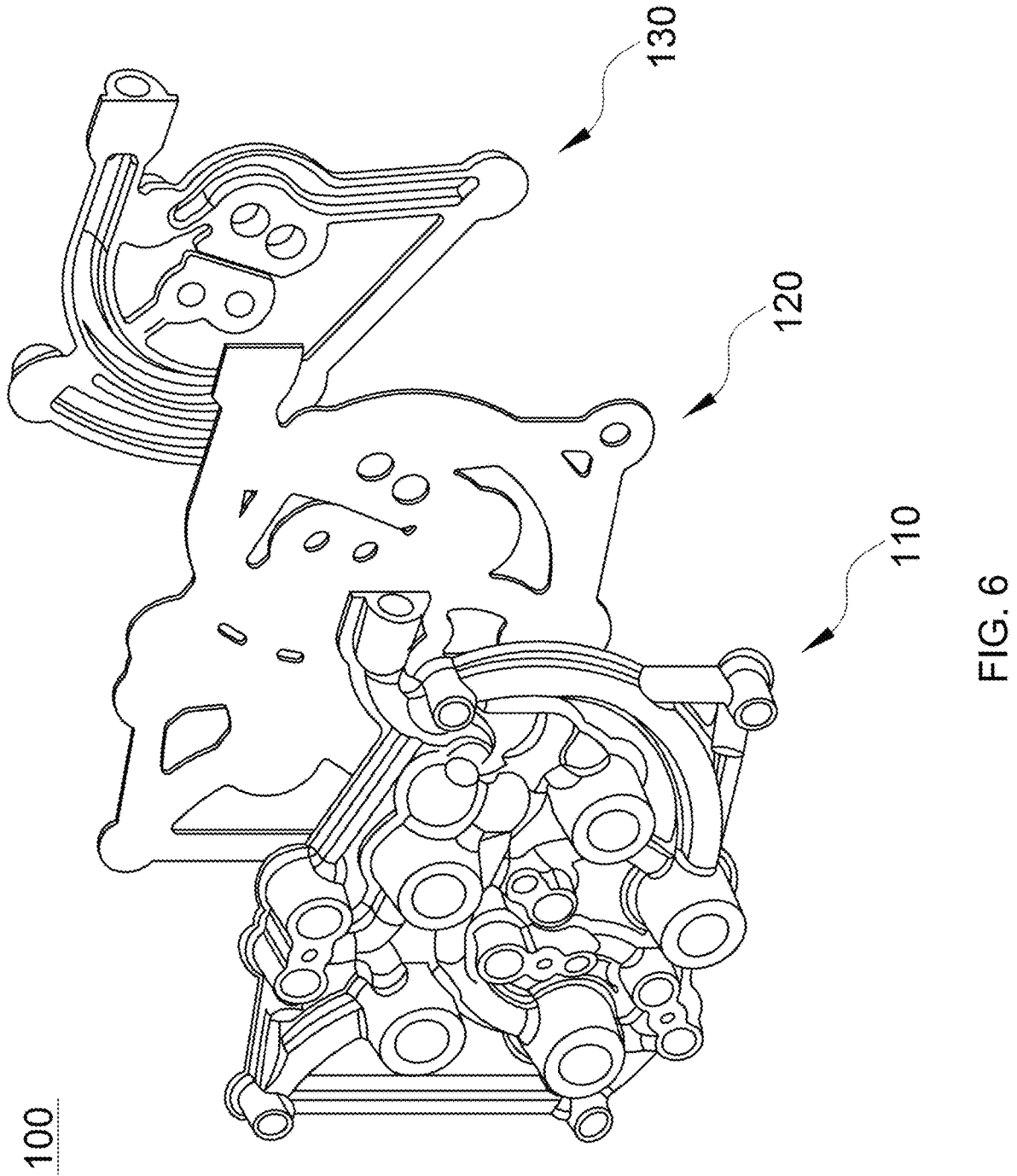
FIG. 6 is an exploded perspective view of FIG. 4.
Figure 7:
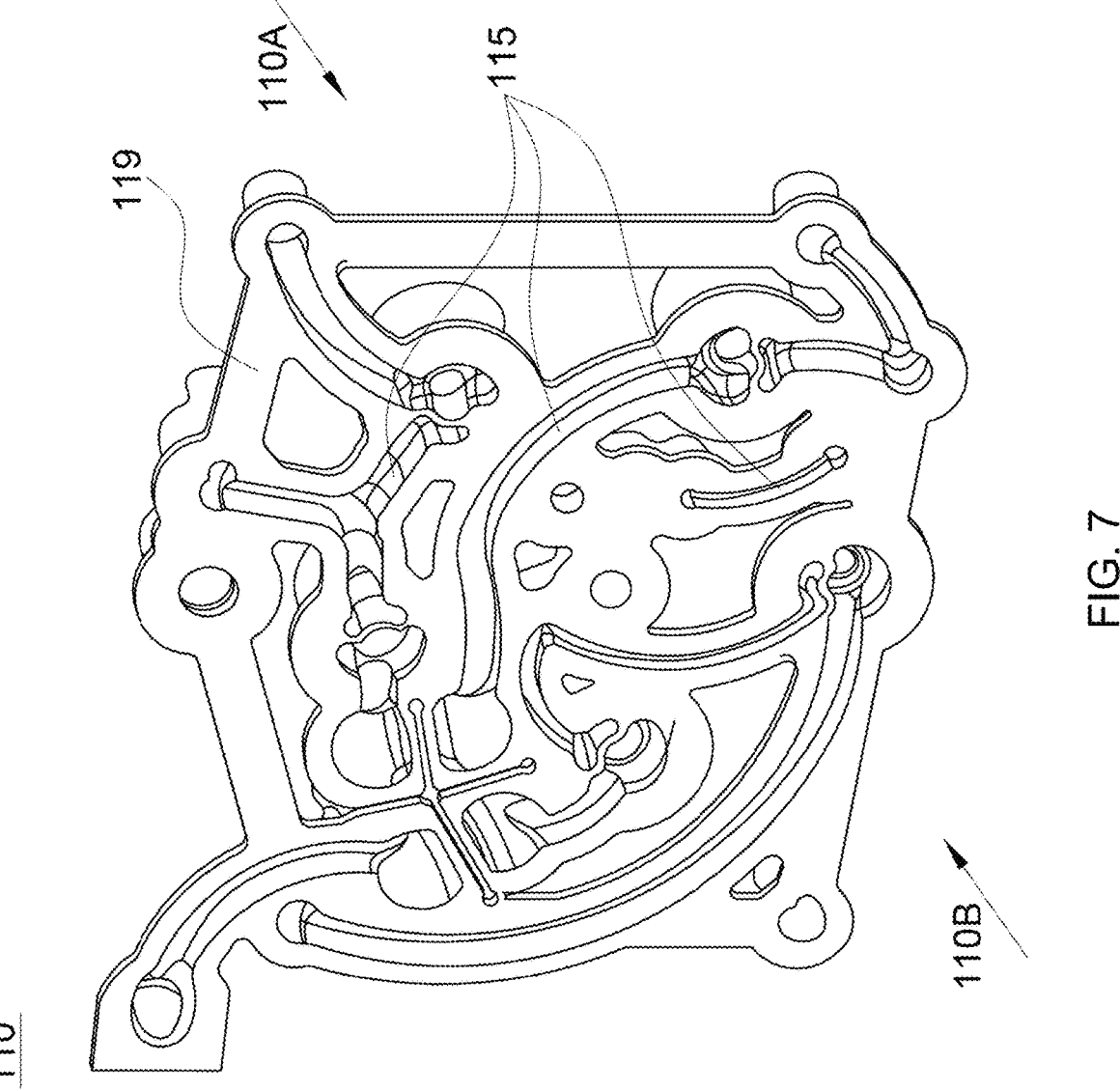
FIG. 7 is a view illustrating a first plate separated from FIG. 6.
Figure 8:
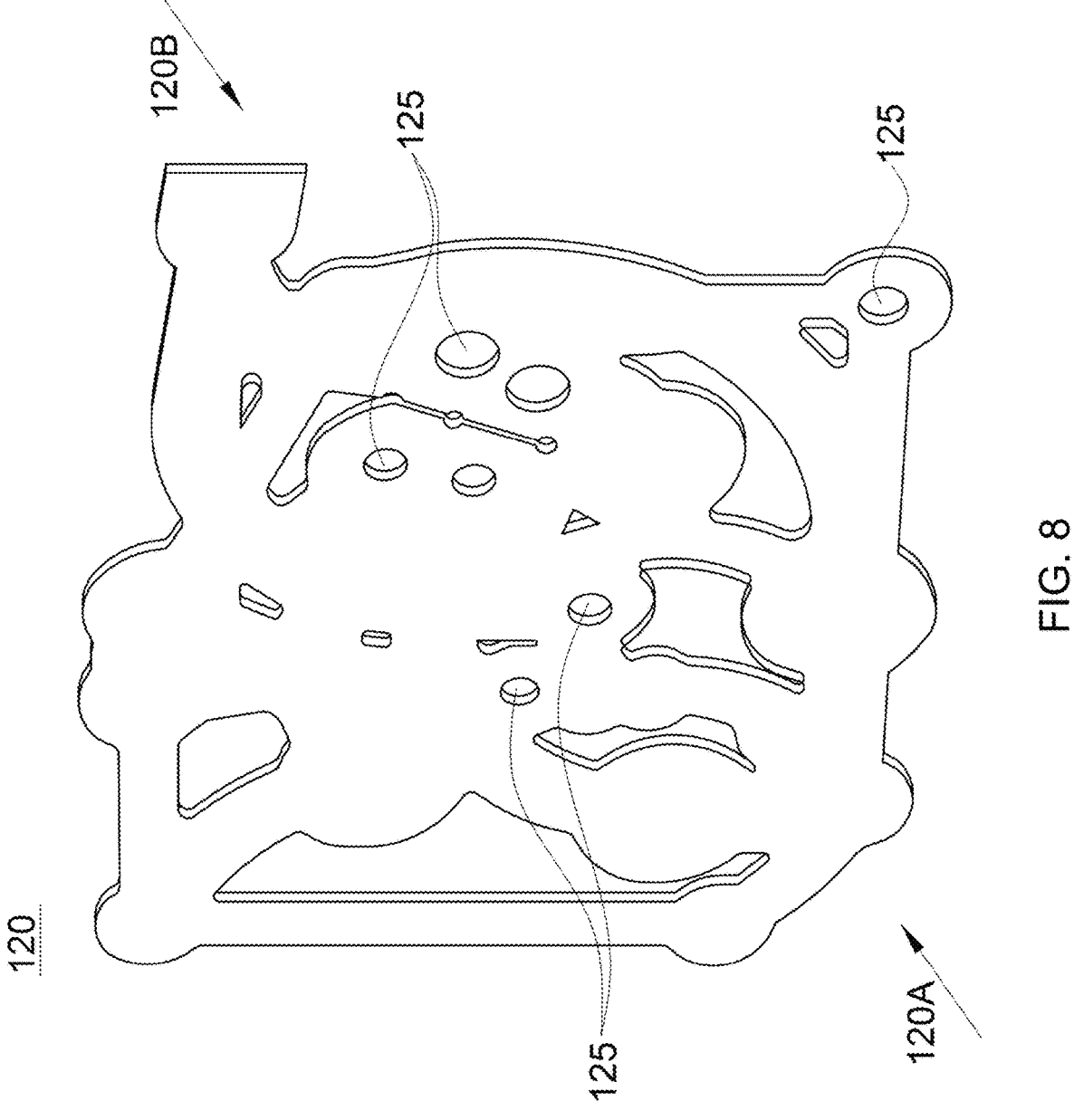
FIG. 8 is a view illustrating a second plate separated from FIG. 6.
Figure 9:
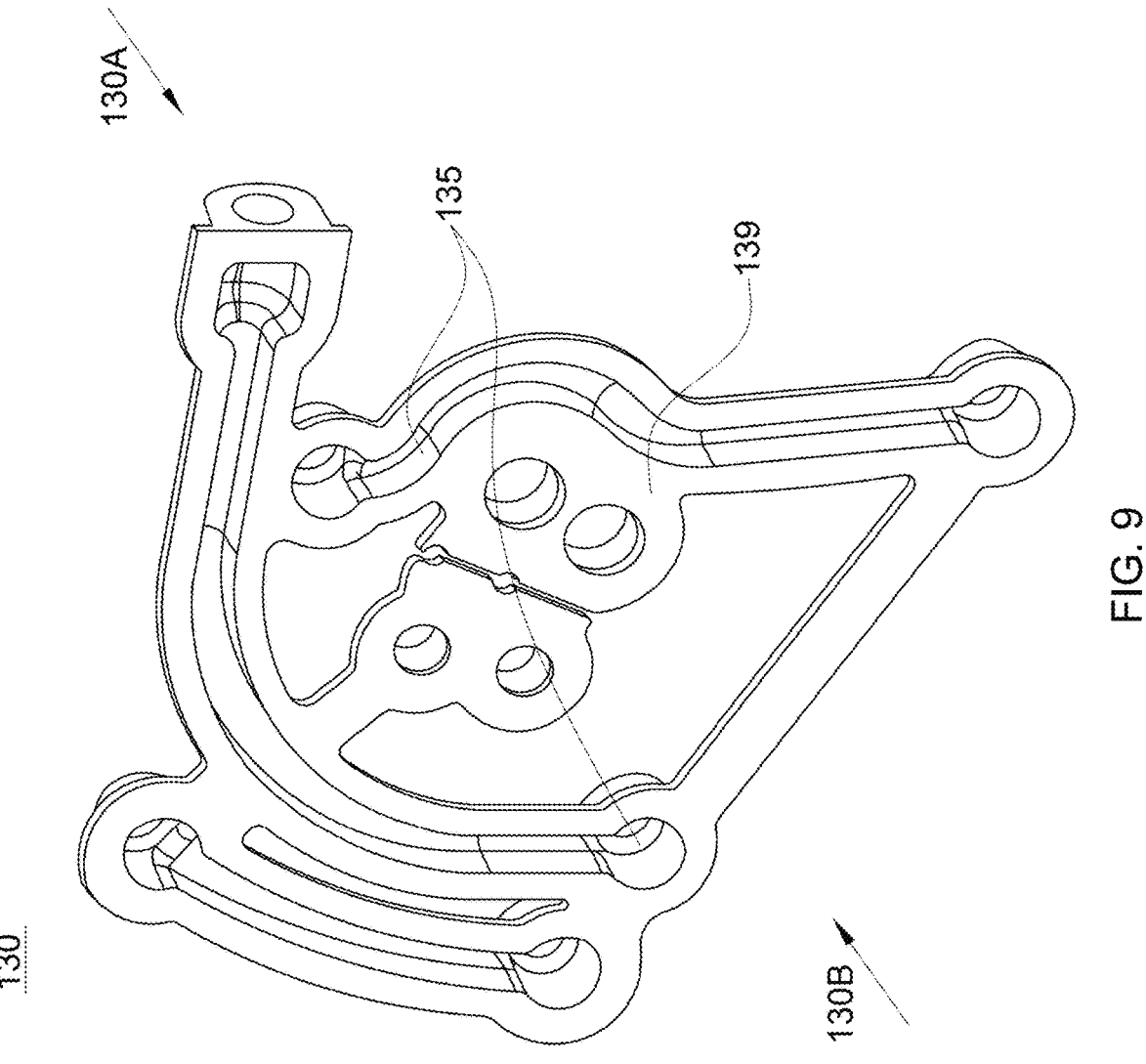
FIG. 9 is a view illustrating a third plate separated from FIG. 6.

Hereinafter, the plate-shaped manifold 100 of the present invention will be described first. FIG. 4 is a front perspective view of the plate-shaped manifold according to the example of the present invention, FIG. 5 is a rear perspective view of FIG. 4, and FIG. 6 is an exploded perspective view of FIG. 4. In addition, FIG. 7 is a view illustrating a first plate separated from FIG. 6, FIG. 8 is a view illustrating a second plate separated from FIG. 6, and FIG. 9 is a view illustrating a third plate separated from FIG. 6.

First, the plate-shaped manifold 100 according to the first embodiment of the present invention may include a first plate 110 and a second plate 120 and has a structure in which the first plate 110 and the second plate 120 are stacked and coupled to each other. The first refrigerant channel 115 may be formed in the structure in which the first plate 110 and the second plate 120 are coupled.

In this case, the first plate 110 may be an arcuate plate having a first line structure 111 formed along the first refrigerant channel 115, and the first refrigerant channels 115 are recessed in the first line structure 111. The second plate 120 may be a flat plate having one surface 120A and the other surface 120B that are formed flat.

More specifically, the first plate 110 is configured to provide a space in which the first refrigerant channel 115 is formed. The first plate 110 has structures formed arcuately from one surface toward the other surface and formed linearly along the first refrigerant channels. Therefore, when the first plate 110 is viewed from the front side, a shape of the first line structure 111 of the first plate 110 may be identical to an overall shape of the first refrigerant channel 115. In this case, the shape of the first refrigerant channel 115 is not limited. Likewise, the first line structure 111 of the first plate 110 may be freely shaped while corresponding to the shape of the first refrigerant channel 115. That is, the first line structure 111 may have a structure in which approximately semicircular pipe-shaped structures are complexly connected to one another on a single plane. The portions corresponding to semicircles of the semicircular pipe-shaped structures may be opened.

Further, in addition to the first line structure 111 for defining the first refrigerant channel 115, the first plate 110 may further include support structures 112 for structurally supporting the first line structure 111 by connecting one portion and the other portion of the first line structure 111. The structure or shape of the support structure 112 is not limited. For example, the support structure 112 may also be formed linearly, and the corresponding line may have a straight shape or a curved shape. The support structure 112 may have a flat shape or a curved shape.

As described above, one surface of the first plate 110 may be formed in a convexly curved shape by the first line structure 111 and the support structure 112, and the other surface of the first plate 110 may be formed such that the first refrigerant channel 115 is concavely recessed along the first line structure 111. Hereinafter, in the present invention, for convenience, one surface of the first plate 110, which is formed in a convexly curved shape, will be referred to as a front surface 110A of the first plate, and the other surface of the first plate 110 will be referred to as a rear surface 110B of the first plate.

In this case, a plurality of mounting ports 116 may be provided in a front or lateral surface of the first plate 110, more specifically, the first line structure 111 and communicate with the first refrigerant channels 115 so that the components 200 may be mounted in the plurality of mounting ports 116. The components 200 are mounted in the mounting ports 116, such that the components 200 may communicate with the first refrigerant channels 115.

In addition, one or more first ports 117 may be provided in the first plate 110 and communicate directly with the first refrigerant channel 115 so as to communicate with the outside. In this case, the term 'outside' may mean other components in the entire cooling line of the vehicle cooling system, for example, an inside condenser, which is another condenser, an evaporator, an outer heat exchanger OHX, or the like in addition to the integrated cooling module of the present invention. The first ports 117 and the other external components may be fluidly connected to one another by means of a valve or the like. Because the ports, which may be connected to the outside, are provided as described above, the other external components, in addition to the components mounted on the plate-shaped manifold, may be connected to the plate-shaped manifold. Therefore, the integrated cooling module may be compactly configured by mounting the essential components directly on the plate-shaped manifold. Further, the external components may be connected indirectly to the plate-shaped manifold, thereby improving the connectivity of the integrated cooling module with the entire cooling system.

The second plate 120 is stacked and coupled to the first plate 110 and configured to close an open lateral side of the first line structure 111 of the first plate 110. The second plate 120 may be formed in a shape corresponding to a shape of the first line structure 111 when viewed from the front side. The second plate 120 may be formed to further have a support portion that adjoins the support structure 112 of the first plate 110. That is, the second plate 120 may be provided in the form of a flat plate and have a shape corresponding to the shape of the structure made by integrating the first line structure 111 of the first plate 110 and the support structure 112 of the first plate 110. Therefore, a portion of the second plate 120, which excludes the portion corresponding to the first line structure 111 of the first plate 110 and the support structure 112 of the first plate 110, may have an empty space. However, as described below, the second plate 120 may further have a portion corresponding to a third plate 130. Therefore, at least a part of one surface 120A of the second plate 120 may be formed in a shape substantially identical to a shape of the rear surface 110B of the first plate 110.

The plate-shaped manifold 100 of the present invention is configured by stacking and coupling the first plate 110 and the second plate 120. The rear surface 110B of the first plate and one surface 120A of the second plate may face each other. In this case, a border surface 119 of the rear surface 110B of the second plate 120, which adjoins one flat surface 120A of the second plate 120, may be formed as a flat surface. That is, a portion of the rear surface 110B of the first plate, which adjoins one surface 120A of the first plate and excludes a portion where the first refrigerant channel 115 is recessed, may be formed flat. Therefore, the border surface 119 of the rear surface 110B of the first plate may be parallelly in surface contact with one flat surface 120A of the second plate.

In the present invention, the plate-shaped manifold has the structure in which the first and second plates are stacked and coupled as described above, which may improve the manufacturability of the plate-shaped manifold. In this case, the first plate is configured as an arcuate plate, and the second plate is configured as a flat plate, such that the first plate may be precisely manufactured regardless of the shape of the first plate, and the second plate may be easily manufactured. In addition, the first and second plates are configured to be in surface contact with each other on the plane, such that the first and second plates may be easily coupled, and the rigidity and sealability of the plate-shaped manifold may be improved when the first and second plates are coupled.

Meanwhile, the plate-shaped manifold 100 according to the second embodiment of the present invention may further include the third plate 130 in addition to the first plate 110 and the second plate 120 and have a structure in which the second plate 120 and the third plate 130 are coupled to each other. That is, as illustrated in FIG. 6, the plate-shaped manifold 100 according to the present example may have a structure in which the second plate 120, which is a flat plate, is disposed between the first and third plates, the first plate 110 is coupled to one surface 120A of the second plate, and the third plate 130 is coupled to the other surface 120B of the second plate. Therefore, in addition to the first refrigerant channel 115 formed between the first plate 110 and the second plate 120, the second refrigerant channel 135 may be additionally formed in the structure in which the second plate 120 and the third plate 130 are coupled.

The third plate 130 and the first plate 110 may be symmetrically structured. That is, the third plate 130 may be an arcuate plate having a second line structure 131 formed along the second refrigerant channel 135, and the second refrigerant channels 135 recessed in the second line structure 131. A shape of the second line structure 131 of the second plate 130 may be identical to an overall shape of the second refrigerant channel 135 when viewed from the front side. In addition to the second line structure 131, the third plate 130 may further include a support structure 132 for structurally supporting the second line structure 131.

Further, one surface of the second plate 130 may be formed in a convexly curved shape by the second line structure 131 and the support structure 132, and the other surface of the second plate 130 may be formed such that the second refrigerant channel 135 is concavely recessed along the second line structure 131. Hereinafter, for convenience, one surface of the second plate 130, which has a convexly curved shape, will be referred to as a front surface 130A of the second plate, and the other surface of the second plate 130 will be referred to as a rear surface 130B of the second plate. In this case, like the first plate 110, a border surface 139 of the third plate 130 of the rear surface 130B of the third plate, which adjoins the other flat surface 120B of the second plate 120, may also be formed as a flat surface.

In this case, the second plate 130 may be formed in a shape corresponding to the shape of the second line structure 131 when viewed from the front side. The second plate 130 may be formed to further have a support portion that adjoins the support structure 132 of the second plate 130. That is, the second plate 130 may include a portion corresponding to the first line structure 111 of the first plate 110 and the support structure 112 of the first plate 110, and a portion corresponding to the second line structure 131 of the second plate 130 and the support structure 132 of the second plate 130. Therefore, at least a part of the other surface 120B of the second plate 120 may be formed in a shape identical to the shape of the rear surface 130B of the third plate.

Meanwhile, like the first plate 110, one or more mounting ports 136 may be provided in a front or lateral surface of the second line structure 131 of the third plate 130 and communicate with the second refrigerant channels 135 so that the components 200 may be mounted in the mounting ports 136. The components 200 are mounted in the mounting ports 116, such that the components 200 may communicate with the second refrigerant channels 135. In addition, one or more second ports 137 may be provided in the third plate 130 and communicate directly with the second refrigerant channel 135 so as to communicate with the outside.

In the present example, with reference back to FIG. 8, one or more through-holes 125 may be formed in the second plate 120. The through-holes 125 are formed through the second plate 120 so that the first refrigerant channel 115 and the second refrigerant channel 135 communicate with each other. Because the first refrigerant channel and the second refrigerant channel communicate with each other through the through-hole, a flow line for the refrigerant may be flexibly designed in the plate-shaped manifold. The first refrigerant channel and the second refrigerant channel may communicate with each other without an additional structure, thereby improving spatial utilization.

As described above, in the plate-shaped manifold 100 according to the present example, the second refrigerant channel 135, which is another refrigerant channel, is further provided in addition to the first refrigerant channel 115 by additionally coupling the second plate 130 to the other surface 120B of the second plate 120 in the plate-shaped manifold according to the first embodiment having the structure in which the first plate 110 is coupled to one surface 120A of the second plate 120. Therefore, the refrigerant channels are intensively provided based on the second plate, which may reduce a size of the plate-shaped manifold and more flexibly design the flow line for the refrigerant. Further, the second plate increases a space in which the components may be mounted and the ports may be provided, thereby improving the component mountability and the connection expandability with the outside.

Meanwhile, the first and third plates 110 and 130, which are arcuate plates, may be made of a material such as aluminum, thermo-plastic, or stainless steel depending on manufacturing methods. The first plate 110 and the second plate 120 may be stacked and coupled by brazing, structural adhesives, mechanical fixation, or the like, and the second plate 120 and the third plate 130 may be stacked and coupled by brazing, structural adhesives, mechanical fixation, or the like.

Hereinafter, the integrated cooling module 10, which is configured by mounting the components 200 on the plate-shaped manifold 100, will be described below. The integrated cooling module 10 may be configured by mounting the components 200 on the plate-shaped manifold 100 according to the first embodiment implemented by coupling the first plate 110 and the second plate 120. Alternatively, the integrated cooling module 10 further includes the third plate 130 in addition to the first plate 110 and the second plate 120, and the first plate 110 and the second plate 120 are coupled to the third plate 130, and the integrated cooling module 10 may be configured by mounting the components 200 on the plate-shaped manifold 100 according to the second embodiment implemented by coupling the second plate 120 and the third plate 130. Hereinafter, for convenience of description, the configuration will be described in which the components 200 are mounted on the plate-shaped manifold 100 according to the second embodiment.

First, in the integrated cooling module 10 of the present invention, the plate-shaped manifold 100 may be disposed to be perpendicular to the bottom surface. That is, as illustrated in FIGS. 1 and 2, the plate-shaped manifold 100 may be formed in a entirely wide plate shaped by stacking and coupling the first, second, and third plates 110, 120, and 130. In this case, the plate-shaped manifold 100 may be disposed in the form standing perpendicularly based on the bottom surface. Therefore, the refrigerant, which flows through the first refrigerant channel 115 and the second refrigerant channel 135, also flows in a direction perpendicular to the bottom surface, such that the refrigerant may flow downward in at least a part region in the plate-shaped manifold 100.

The components 200 may be mounted on the front surface of the plate-shaped manifold 100. With reference back to FIG. 3, the integrated cooling module 10 according to the example of the present invention may be configured such that the components 200 are mounted only on the front surface among the front and rear surfaces of the manifold 100. In this case, the components 200 may include the condenser COND, the chiller, the PT sensor, and the expansion valve EXV. As described above, the configuration in which the components are intensively disposed on one surface of the plate-shaped manifold may be advantageous in terms of spatial utilization, weight distribution, and cooling efficiency. However, the present invention is not limited thereto. The components may be additionally mounted on the other surface of the plate-shaped manifold, i.e., the front surface of the third plate.

A plurality of PT sensors and a plurality of expansion valves EXV may be mounted. For example, as illustrated in FIG. 3, three PT sensors may be mounted, and five expansion valves may be mounted. In the present invention, the expansion valve EXV may particularly be an electric refrigerant valve (ERV) and serve to increase the pressure of the refrigerant and open or close a part or the entirety of a flow path. Therefore, a cooling circuit in the flow path may be changed to be suitable for each mode.

Figure 10:
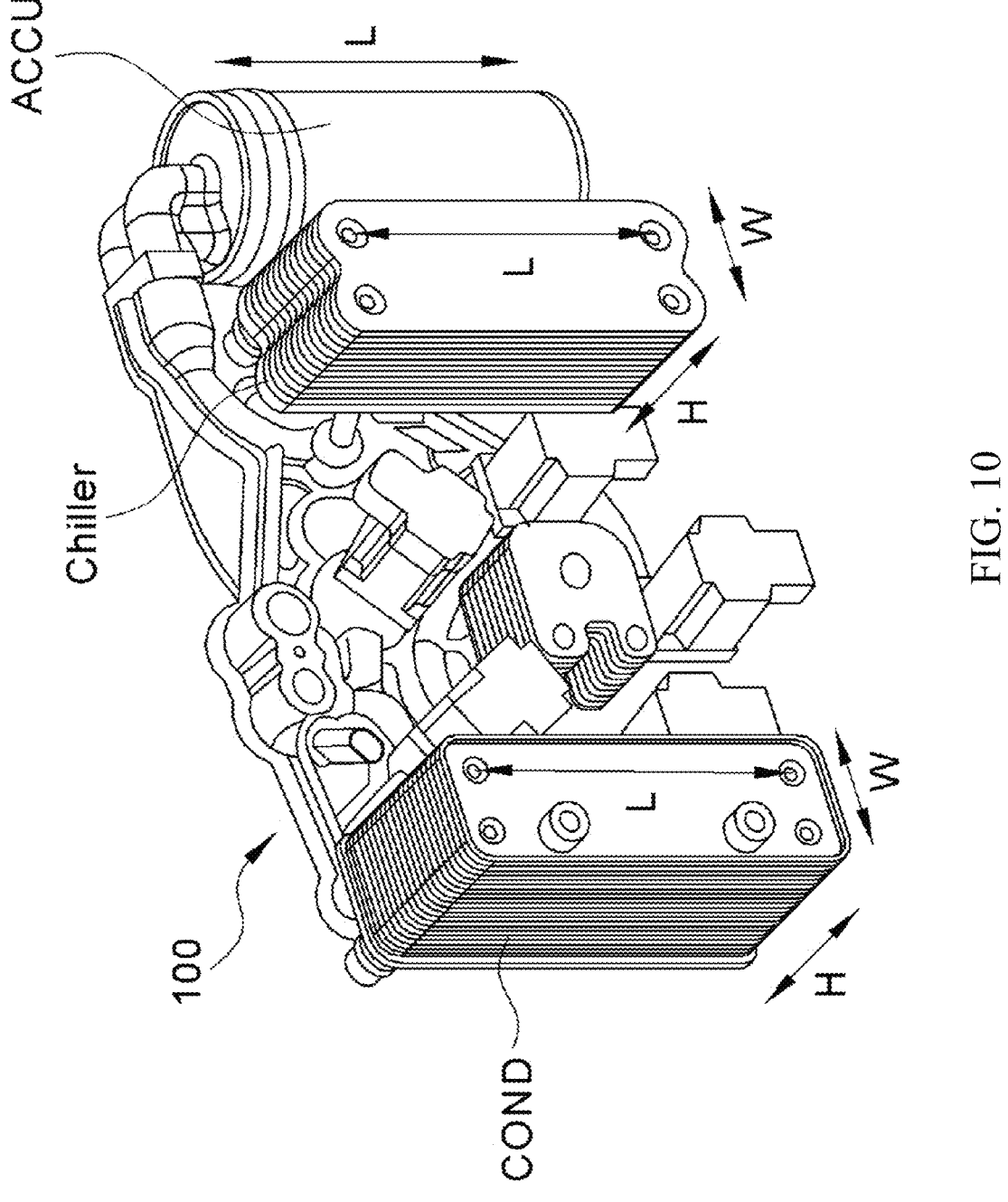
FIG. 10 is a view illustrating FIG. 1 again.

The condenser COND and the chiller may be disposed such that a longitudinal direction L of the condenser COND and the chiller is parallel to the gravitational direction. FIG. 10 is a view illustrating FIG. 1 again. FIG. 10 illustrates the longitudinal direction L, a width direction W, and a height direction H of the condenser and the chiller. As illustrated, the longitudinal direction L of the condenser COND and the chiller is perpendicular to the bottom surface, such that the condenser COND and the chiller may be mounted on the manifold 100 so that the longitudinal direction L of the condenser COND and the chiller is parallel to the gravitational direction. Therefore, the condenser COND and the chiller may be disposed in parallel with each other. This is to widely disperse a load in the longitudinal direction of the condenser and the chiller in case that the condenser and the chiller are relatively heavy. Therefore, it is possible to maximally prevent damage to a sealing subsidiary material such as an O-Ring caused by degradation of a coupling/ connecting portion with the manifold, i.e., an excessive eccentric load, bending stress, or the like. In addition, because a load is widely dispersed, it is possible to ensure stability and excellent NVH performance during a maintain process.

In the integrated cooling module 10 of the present invention, the accumulator ACCU may be further mounted on one side surface of the plate-shaped manifold 100. The accumulator ACCU may communicate with the first refrigerant channel 115 or communicate both with the first refrigerant channel 115 and the second refrigerant channel 135. In case that the accumulator ACCU communicates both with the first refrigerant channel 115 and the second refrigerant channel 135, the refrigerant, which flows through the second refrigerant channel 135, may particularly be in a gaseous state. This configuration differentiates a state of the refrigerant flowing through the first refrigerant channel and a state of the refrigerant flowing through the second refrigerant channel, thereby maximizing cooling efficiency by appropriately using a relationship therebetween at the time of designing the integrated cooling module. In addition, as illustrated in FIG. 10, the accumulator ACCU may be mounted on one side surface of the plate-shaped manifold 100 so that the longitudinal direction L is parallel to the gravitational direction, such that the accumulator ACCU may effectively separate the gaseous refrigerant and the liquid refrigerant.

In this case, the integrated cooling module 10 of the present invention may have a structure in which the condenser COND is disposed at one end (e.g., a leftmost side), the accumulator ACCU is disposed at the other end (e.g., a rightmost side), and the chiller is disposed between the condenser COND and the accumulator ACCU, when the plate-shaped manifold 100 is viewed from the front side. Because the condenser and the accumulator are heavier than the other components, the condenser and the accumulator are respectively disposed at the outermost peripheries to appropriately distribute the weight in a leftward/rightward direction, thereby ensuring the structural stability of the integrated cooling module.

Meanwhile, as described above, the integrated cooling module 10 of the present invention may be manufactured to have the two selective structures based on the basic structure in which the condenser, the chiller, the PT sensor, the expansion valve, and the accumulator are mounted on the plate-shaped manifold. One of the selective structures may be a structure in which the condenser COND is configured as a water-cooled condenser, and a plate type inner heat exchanger P-IHX is further mounted on the front surface of the plate-shaped manifold. The other of the selective structures may be a structure in which the condenser is configured as an air-cooled condenser, and an inner heat exchanger IHX is accommodated and integrated in the accumulator ACCU. FIG. 10 illustrates the former structure, and the later structure is not separately illustrated. The former structure is better in heat exchange performance than the later structure, but the former structure is more expensive than the later structure. Therefore, the former and later structures may be appropriately selected depending on the use thereof.

Figure 11:
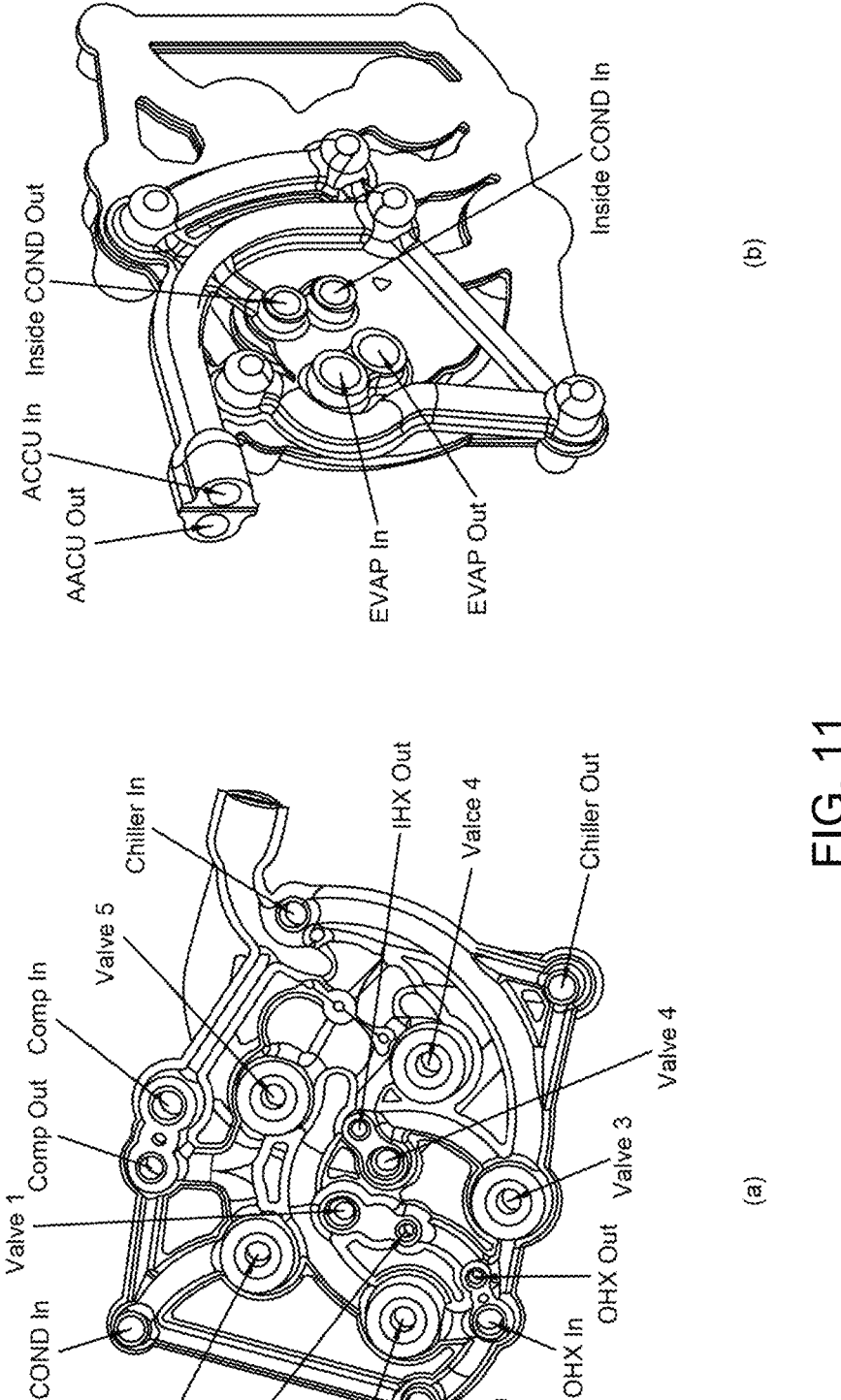
FIG. 11 is a view schematically illustrating the integrated cooling module.
Figure 12:
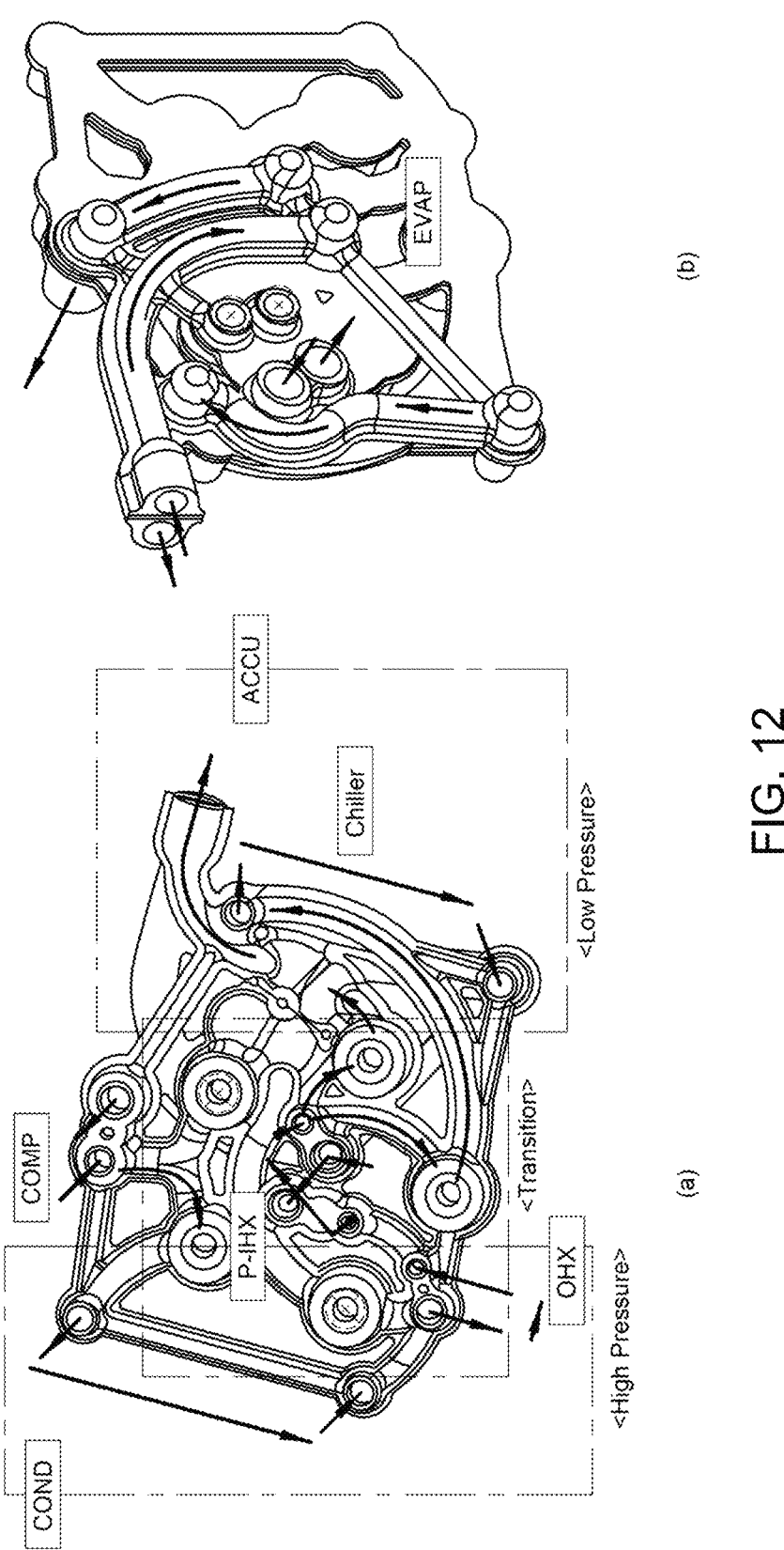
FIG. 12 is a view illustrating a flow of a refrigerant in an A/C mode.
Figure 13:
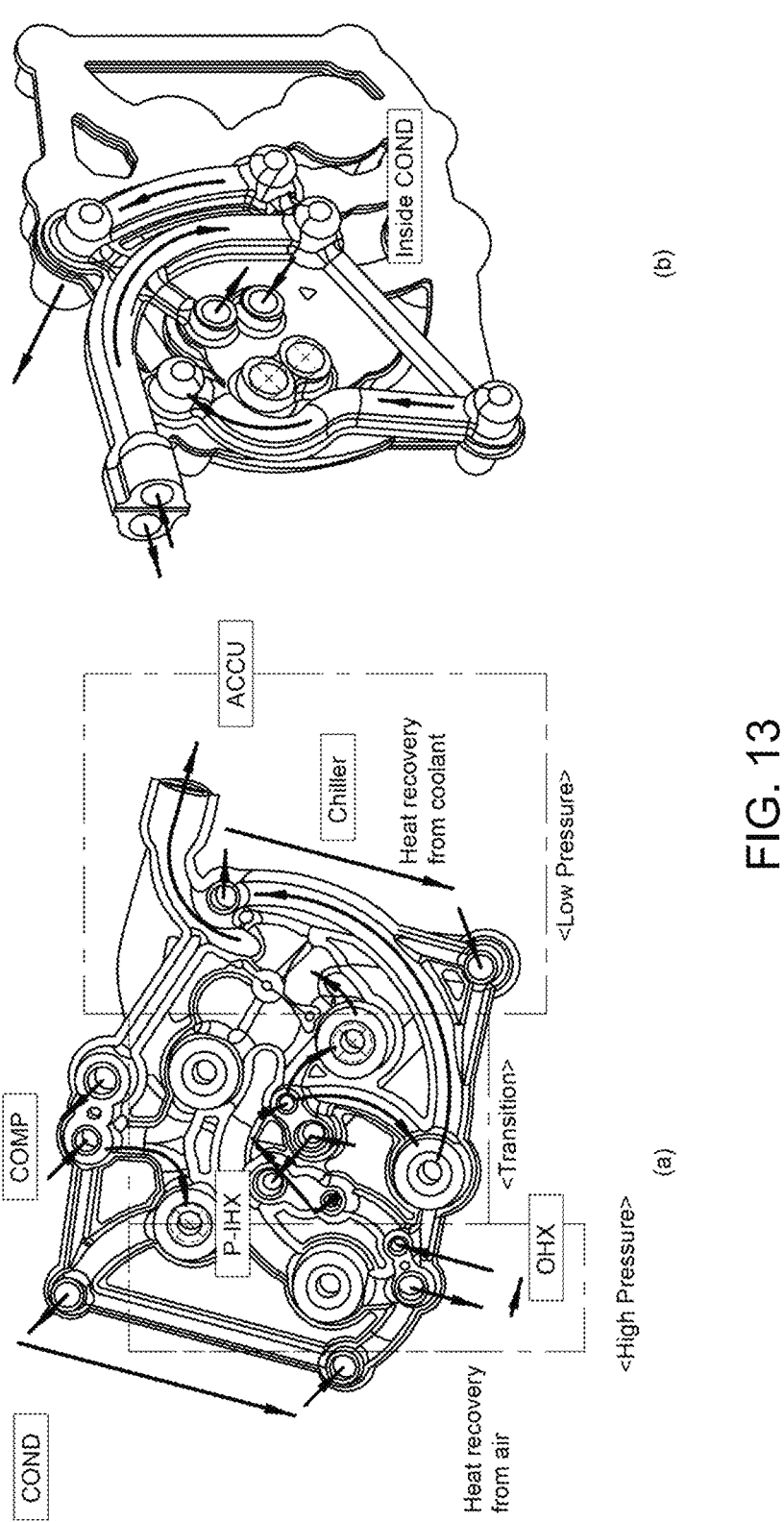
FIG. 13 is a view illustrating a flow of the refrigerant in an H/P mode.

Hereinafter, the circulation of the refrigerant in an A/C mode (cooling mode) and an H/P mode (heating mode) in the integrated cooling module will be described. FIG. 11 is a view schematically illustrating the integrated cooling module, FIG. 12 is a view illustrating a flow of the refrigerant in the A/C mode, and FIG. 13 is a view illustrating a flow of the refrigerant in the H/P mode. As illustrated in FIG. 11, the expansion valves may be configured as first to fifth valves (Valves 1 to 5). In this case, the fourth valve Valve 4 may be partially opened in the A/C mode and serve as an expansion valve, and the fourth valve Valve 4 may be partially opened in the H/P mode and serve to absorb waste heat from a battery. In addition, the fourth valve Valve 4 may be configured to be completely closed in case that the cooling of the battery depends on LTR in the A/C mode or it is not necessary to absorb waste heat of the battery in the H/P mode. In addition, the remaining valves may be configured to open or close a part or the entirety of the flow path as described above.

First, a flow of the refrigerant in the A/C mode will be described with reference to FIG. 12. FIG. 12A illustrates a flow of the refrigerant in the first refrigerant channel, and FIG. 12B illustrates a flow of the refrigerant in the second refrigerant channel. As illustrated in FIG. 12, in the A/C mode, the first, third, and fourth valves may be opened, and the second and fifth valves may be closed.

As illustrated, the refrigerant is introduced into a COMP-out port from an external compressor COMP and introduced into the condenser COND after passing through the first valve Valve 1. Thereafter, the refrigerant passes through the condenser COND, passes through the outer heat exchanger OHX through an OHX-in port, and returns to the first refrigerant channel through an OHX-out port. Thereafter, the refrigerant passes through the inner heat exchanger P-IHX and moves to be distributed to the third valve Valve 3 and the fourth valve Valve 4. The refrigerant, which has been moved to the third valve Valve 3, may pass through the chiller, move to the inner heat exchanger P-IHX again, and be finally discharged to the outside through the COMP-in port. The refrigerant, which has been moved to the fourth valve Valve 4, may move to the second refrigerant channel through the through-hole, pass through an evaporator EVAP through an EVAP-in port, return to the first refrigerant channel through an EVAP-out port, move to the first refrigerant channel through the through-hole, pass through the accumulator ACCU so that the gaseous refrigerant and the liquid refrigerant are separated, move to the inner heat exchanger P-IHX again, and be finally discharged to the outside through the COMP-in port. In the present mode, the cooling performance may be improved by supercooling the refrigerant by means of air with a temperature lower by about 10° C. than a temperature of the refrigerant in the outer heat exchanger OHX. Further, a temperature of the refrigerant at the intake side for the refrigerant is low, and thus the refrigerant may be supercooled additionally, which may maximize cooling performance.

Next, a flow of the refrigerant in the H/P mode will be described with reference to FIG. 13. FIG. 13A illustrates a flow of the refrigerant in the first refrigerant channel, and FIG. 13B illustrates a flow of the refrigerant in the second refrigerant channel. As illustrated in FIG. 13, in the H/P mode, the first, third, and fourth valves may be closed, and the second and fifth valves may be opened, unlike the A/C mode.

As illustrated, the refrigerant is introduced into the COMP-out port from the external compressor COMP, passes through the fifth valve Valve 5, moves to the second refrigerant channel through the through-hole, passes through an inside condenser INSIDE COND through an INSIDE COND-in port, and returns to the second refrigerant channel through an INSIDE COND-out port. Thereafter, the refrigerant may move to the first refrigerant channel through the through-hole, pass through the second valve, pass through the outer heat exchanger OHX through the OHX-in port, return to the first refrigerant channel through the OHX-out port, sequentially pass through the chiller and the accumulator, pass through the inner heat exchanger P-IHX, and be finally discharged to the outside through the COMP-in port. In the present mode, the system performance may be further improved by using waste heat of air by means of the outer heat exchanger OHX, and the heating performance may be maximized by means of a heat source such as a high refrigerant heat source (e.g., PE, a motor, a battery, etc.).

According to the integrated cooling module of the present invention as described above, the constituent elements are intensively integrated with the plate-shaped manifold to constitute the cooling circulation circuit. Therefore, hoses or pipes may be excluded by the integration of the components that constitute the cooling system, thereby achieving miniaturization and weight reduction of the entire cooling system. Further, mounting structures (brackets, bolts, nuts, etc.) for mounting the components in the vehicle may be eliminated, which may reduce the number of components and the number of assembling processes at the time of configuring the cooling system.

In addition, the plate-shaped manifold of the present invention has the structure in which the arcuate plate and the flat plate are stacked and coupled, such that the two plates may be easily coupled, and the rigidity and sealability of the plate-shaped manifold may be improved when the two plates are coupled.

While the embodiments of the present invention have been described with reference to the accompanying drawings, those skilled in the art will understand that the present invention may be carried out in any other specific form without changing the technical spirit or an essential feature thereof. Therefore, it should be understood that the above-described embodiments are illustrative in all aspects and do not limit the present invention.

DESCRIPTION OF REFERENCE NUMERALS

10: Integrated cooling module
100: Plate-shaped manifold
110: First plate
115: First refrigerant channel
120: Second plate
130: Third plate
135: Second refrigerant channel
200: Component

12

COND: Condenser
Chiller: Chiller
EXV: Expansion valve
PT Sensor: PT sensor
IHX: Inner heat exchanger
ACCU: Accumulator

What is claimed is:

1. An integrated cooling module comprising:
a plate-shaped manifold; and
components mounted on a component-mounting surface of the plate-shaped manifold,
wherein the plate-shaped manifold has a structure in which a first plate and a second plate are stacked and coupled to each other to form a first refrigerant channel between the first plate and the second plate,
wherein the first refrigerant channel is recessed in a first linear structure formed on an inner surface of the first plate, and
wherein the second plate is a flat plate having a first flat surface facing the first plate, and a second flat surface facing the first flat surface.

2. The integrated cooling module of claim 1, wherein a border surface of the inner surface of the first plate that adjoins the first flat surface of the second plate is a flat surface.

3. The integrated cooling module of claim 1, wherein at least a part of the first flat surface of the second plate has a shape corresponding to the shape of the inner surface of the first plate.

4. The integrated cooling module of claim 1, wherein one or more first ports are formed in the first plate to communicate directly with the first refrigerant channel and with an external component.

5. The integrated cooling module of claim 1, wherein the plate-shaped manifold is installed such that a plate surface of the manifold extends in a vertical direction relative to an installation surface on a vehicle.

6. The integrated cooling module of claim 5, wherein the components mounted on the plate-shaped manifold include a condenser, a chiller, a pressure/temperature sensor, and an expansion valve.

7. The integrated cooling module of claim 6, wherein the condenser and the chiller are disposed such that mounted on the plate-shaped manifold extends substantially in the vertical direction of the installed manifold.

8. The integrated cooling module of claim 6, wherein an accumulator is further mounted on a side surface of the plate-shaped manifold, and the accumulator communicates with the first refrigerant channel.

9. The integrated cooling module of claim 8, wherein the condenser is disposed at one lateral end, of the component-mounting surface and the accumulator is disposed at an opposite lateral end of component-mounting surface of the plate-shaped manifold.

10. The integrated cooling module of claim 8, wherein the condenser is a water-cooled condenser, and a plate type inner heat exchanger is further mounted on the component-mounting surface of the plate-shaped manifold.

11. The integrated cooling module of claim 8, wherein the condenser is an air-cooled condenser, and an inner heat exchanger is integrally accommodated in the accumulator.

12. The integrated cooling module of claim 1, wherein the plate-shaped manifold further comprises a third plate,
wherein the the second plate and the third plate are stacked and coupled to each other to form a second refrigerant channel between the second plate and the third plate, and wherein the second refrigerant channel is recessed in a second linear structure formed on an inner surface of the third plate formed along the second refrigerant channel.

13. The integrated cooling module of claim 12, wherein a border surface of the inner surface of the third plate is a flat surface and adjoins a flat surface of the second plate.

14. The integrated cooling module of claim 12, wherein at least a part of the flat surface of the second plate has a shape corresponding to the shape of the inner surface of the third plate.

15. The integrated cooling module of claim 12, wherein one or more second ports are formed in the third plate and communicate directly with the second refrigerant channel and with an external component.

16. The integrated cooling module of claim 12, wherein the second plate includes one or more through-holes extending through the second plate to allow the first refrigerant channel and the second refrigerant channel to communicate with each other.

17. The integrated cooling module of claim 12, wherein an accumulator is mounted on a side surface of the plate-shaped manifold, and the accumulator communicates with both the first refrigerant channel and the second refrigerant channel.

* * * * *